(12) United States Patent
Li et al.

(10) Patent No.: US 11,659,820 B2
(45) Date of Patent: May 30, 2023

(54) SEA LICE MITIGATION BASED ON HISTORICAL OBSERVATIONS

(71) Applicant: X Development LLC, Mountain View, CA (US)

(72) Inventors: Yi Li, Cupertino, CA (US); Grace Calvert Young, Mountain View, CA (US)

(73) Assignee: X Development LLC, Mountain View, CA (US)

(*) Notice: Subject to any disclaimer, the term of this patent is extended or adjusted under 35 U.S.C. 154(b) by 72 days.

(21) Appl. No.: 16/825,577

(22) Filed: Mar. 20, 2020

(65) Prior Publication Data

US 2021/0289758 A1    Sep. 23, 2021

(51) Int. Cl.
*A01K 61/13*    (2017.01)
*A01K 61/95*    (2017.01)

(52) U.S. Cl.
CPC .............. *A01K 61/13* (2017.01); *A01K 61/95* (2017.01)

(58) Field of Classification Search
CPC ........ A01K 61/95; A01K 61/13; A01K 61/90; A01K 61/00
USPC .......................................................... 119/231
See application file for complete search history.

(56) References Cited

U.S. PATENT DOCUMENTS

| | | | |
|---|---|---|---|
| 9,072,281 B2 * | 7/2015 | Beck ....................... | A01K 61/95 |
| 9,952,167 B1 * | 4/2018 | Cox ........................ | G01N 33/12 |
| 10,856,520 B1 | 12/2020 | Kozachenok et al. | |
| 10,863,727 B2 * | 12/2020 | Jans ........................ | A01K 61/13 |
| 2003/0104353 A1 * | 6/2003 | Brielmeier ............. | A01K 61/00 435/5 |
| 2010/0081961 A1 * | 4/2010 | Cox ........................ | A01K 61/90 600/547 |

(Continued)

FOREIGN PATENT DOCUMENTS

| | | |
|---|---|---|
| CA | 3065387 | 12/2018 |
| CN | 108040948 | 5/2018 |

(Continued)

OTHER PUBLICATIONS

[No Author Listed], "2020 The State of World Fisheries and Aquaculture," Food and Agriculture Organization of the United Nations, 2020, 224 pages.

(Continued)

*Primary Examiner* — Brady W Frazier
*Assistant Examiner* — Kevin M Dennis
(74) *Attorney, Agent, or Firm* — Fish & Richardson P.C.

(57) ABSTRACT

Methods, systems, and apparatus, including computer programs encoded on computer-storage media, for sea lice mitigation. In some implementations, a method includes obtaining multiple observations of a population of reference fish across a period of time, generating, from the multiple observations, a record for each reference fish that indicates an extent of sea lice infestation for the reference fish across the period of time, training, based on the records, a model that determines a predicted health indicator for a fish, obtaining an image of a sample fish that is not in the population of reference fish, determining, based on the image of the sample fish and with the model, a predicted health indicator for the sample fish, and selectively initiating sea lice mitigation based on the predicted health indicator.

20 Claims, 3 Drawing Sheets

(56) References Cited

U.S. PATENT DOCUMENTS

| | | | | |
|---|---|---|---|---|
| 2013/0050465 | A1* | 2/2013 | Beck | A01K 61/10 |
| | | | | 348/81 |
| 2015/0000606 | A1* | 1/2015 | Angell | A01K 61/13 |
| | | | | 119/223 |
| 2017/0150701 | A1 | 6/2017 | Gilmore et al. | |
| 2018/0000055 | A1* | 1/2018 | Tanase | A01K 61/00 |
| 2018/0146647 | A1* | 5/2018 | Isaksson | A61P 43/00 |
| 2018/0295816 | A1* | 10/2018 | Wiesman | A01K 61/13 |
| 2018/0303073 | A1* | 10/2018 | Jans | A01K 61/90 |
| 2019/0228218 | A1 | 7/2019 | Barnaby et al. | |
| 2019/0340440 | A1 | 11/2019 | Atwater et al. | |
| 2020/0107524 | A1 | 4/2020 | Messana et al. | |
| 2020/0155882 | A1 | 5/2020 | Tohidi et al. | |
| 2020/0170226 | A1* | 6/2020 | Aas | G01J 3/0229 |
| 2020/0288678 | A1 | 9/2020 | Howe et al. | |
| 2020/0367475 | A1* | 11/2020 | Howe | G06K 9/0063 |
| 2021/0064034 | A1* | 3/2021 | Ouyang | A01K 61/13 |
| 2021/0068375 | A1* | 3/2021 | Jans | A01K 61/13 |
| 2021/0142052 | A1* | 5/2021 | James | G06K 9/6256 |
| 2021/0209351 | A1* | 7/2021 | Young | G06K 9/00362 |
| 2021/0212298 | A1* | 7/2021 | Messana | A01K 61/13 |

FOREIGN PATENT DOCUMENTS

| | | | |
|---|---|---|---|
| EP | 2244934 | 11/2010 | |
| EP | 2962556 A1 * | 6/2015 | A01K 61/13 |
| EP | 2962556 | 1/2016 | |
| EP | 3484283 | 5/2019 | |
| JP | 2002171853 | 6/2002 | |
| KR | 2019093786 A * | 8/2019 | A01K 61/00 |
| NO | 300401 | 5/1997 | |
| NO | 345829 | 10/2019 | |
| WO | WO 1990/007874 | 7/1990 | |
| WO | WO 1997/019587 | 6/1997 | |
| WO | WO 2009/008733 | 1/2009 | |
| WO | WO 2009/097057 | 8/2009 | |
| WO | WO 2011/135384 | 11/2011 | |
| WO | WO 2014/179482 | 11/2014 | |
| WO | WO 2018/011744 | 1/2018 | |
| WO | WO 2019/002881 | 1/2019 | |
| WO | WO 2019/121851 | 6/2019 | |
| WO | WO 2019/121900 | 6/2019 | |
| WO | WO-2019121900 A1 * | 6/2019 | A01K 61/13 |
| WO | WO 2019/188506 | 10/2019 | |
| WO | WO 2019/232247 | 12/2019 | |
| WO | WO 2020/046524 | 3/2020 | |
| WO | WO 2020/132031 | 6/2020 | |
| WO | WO 2021/006744 | 1/2021 | |
| WO | WO 2021/030237 | 2/2021 | |
| WO | WO 2022/010815 | 1/2022 | |
| WO | WO 2020/072438 | 4/2022 | |

OTHER PUBLICATIONS

Aunsmo et al., "Accuracy and precision of harvest stock estimation in Atlantic salmon farming," Aquaculture, Mar. 2013, 369(399):113-118.
Aunsmo et al., "Field validation of growth models used in Atlantic salmon fanning," Aquaculture, Mar. 2014, 428(429):249-257.
Boldt et al., "Development of stereo camera methodologies to improve pelagic fish biomass estimates and infonn ecosystem management in marine waters," Fisheries Research, 2018, 198:66-77.
Costello et al., "The future of food from the sea," Nature, Dec. 2020, 588:95-100.
Crippa et al., "Food systems are responsible for a third of global anthropogenic GHG emissions," Nature Food, Mar. 2021, 2:198-209.
Fore et al., "Precision fish farming: A new framework to improve production in aquaculture," Biosystems Engineering, Nov. 2017, 173:176-193.
Fry et al., "Feed conversion efficiency in aquaculture: do we measure it correctly?," Environ. Res. Lett., Feb. 2018, 13:024017.
Harvey et al., "The accuracy and precision of underwater measurements of length and maximum body depth of southern bluefin tuna (thunnus maccoyii) with a stereo-video camera system," Fisheries Research, Sep. 2003, 63(3):315-326.
Hilborn et al., "The environmental cost of animal source foods," Front Ecol Environ, 2018, 16(6):329-335.
Hockaday et al., "Using truss networks to estimate the biomass of Oreochromis niloticus, and to investigate shape characteristics," Journal of Fish Biology, May 2000, 57:981-1000.
Kang et al., "A Study on the Search of Optimal Aquaculture farm condition based on Machine Learning," The Journal of The Institute of Internet, Broadcasting and Communication, Apr. 2017, 17(2):135-140.
Macleod et al., "Quantifying and mitigating greenhouse gas emissions from global aquaculture," FAO Fisheries and Aquaculture Technical Paper, Mar. 2019, 626:50 pages.
Murray et al., "Using the H-index to assess disease priorities for salmon aquaculture," Preventive Veterinary Medicine, Apr. 2016, 126:199-207.
Parker et al., "Fuel use and greenhouse gas emissions of world fisheries," Nature Climate Change, Apr. 2018, 8:333-337.
Pérez et al., "Automatic measurement of fish size using stereo vision," 2018 IEEE International Instrumentation and Measurement Technology Conference, May 2018, 6 pages.
Pettersen et al., "Detection and classification of lepeopliterius salmonis (krøyer, 1837) using underwater hyperspectral imaging," Aquacultural Engineering, Nov. 2019, 87:102025.
Rahman et al., "Developing an Ensembled Machine Learning Prediction Model for Marine Fish and Aquaculture Production," Sustainability, 2021, 13:9124.
Shafait et al., "Towards automating underwater measurement of fish length: a comparison of semi-automatic and manual stereovideo measurements," ICES Journal of Marine Science, 2017, 13 pages.
Troell et al., "Does aquaculture add resilience to the global food system?," PNAS, Sep. 2014, 111(37):13257-13263.
Yang et al., "Deep learning for smart fish farming: applications, opportunities and challenges," Reviews in Aquaculture, 2021, 13(1):66-90.
Maloy et al., "A spatio-temporal recurrent network for salmon feeding action recognition from underwater videos in aquaculture," Computers and Electronics in Agriculture, Nov. 12, 2019, 9 pages.
Odey, "AquaMesh—Design and Implementation of Smart Wireless Mesh Sensor Networks for Aquaculture," American Journal of Networks and Communications, Jul. 2013, 8 pages.
Petrov et al., "Overview of the application of computer vision technology in fish farming," E3S Web of Conferences, 2020, 175:02015.
Saberloon et al., "Application of Machine Vision Systems in Aquaculture with Emphasis on Fish: State-of-the-Art and Key Issues," Reviews in Aquaculture, Dec. 2017, 9:369-387.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Wang, "Robust tracking of fish schools using CNN for head identification," Multimedia Tools and Applications, Nov. 2017, 20 pages.
PCT International Search Report and Written Opinion in International Appln. No. PCT/US2021/020460, dated Jun. 16, 2021, 13 pages.
International Preliminary Report on Patentability in International Appln. No. PCT/US2021/020460, dated Sep. 29, 2022, 7 pages.
Extended Search Report in European Appln. No. 22151132.2, dated May 2, 2022, 10 pages.
International Preliminary Report on Patentability in International Appln. No. PCT/US2020/059829, dated May 27, 2022, 11 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.

(56) References Cited

OTHER PUBLICATIONS

International Search Report and Written Opinion in International Appln No. PCT/US2022/022492, dated Jun. 28, 2022, 13 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
International Search Report and Written Opinion in International Appln. No. PCT/US2020/059829, dated Feb. 25, 2021, 18 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Qiu et al., "Improving Transfer Learning and Squeeze-and-Excitation Networks for Small-Scale Fine-Grained Fish Image Classification," IEEE Access, Dec. 2018, 6(31):78503-78512.
Stein et al., "Consistent melanophore spot patterns allow long-term individual recognition of Atlantic salmon Salmo Salar," Journal of Fish Biology, Nov. 2017, 91(6):1699-1712.

\* cited by examiner

SEA LICE MITIGATION BASED ON HISTORICAL OBSERVATIONS

TECHNICAL FIELD

This specification generally describes techniques for performing enhanced sea lice mitigation.

BACKGROUND

Sea lice feed on the mucus epidermal tissue and blood of host marine fish. Sea lice refer to members of a family of copepods within the order Siphonostomatoida, family Caligidae. Sea lice infestations can be a major problem in fish farming, since heavy infections can lead to deep lesions, particularly on the head region. Sea lice infestations can kill or render fish unsuitable for market.

SUMMARY

In general, innovative aspects of the subject matter described in this specification relate to sea lice mitigation. Fish may be farmed in controlled environments. For example, salmon may be raised from juvenile to adult inside a pen in the ocean. Some fish that are raised in a farm may become unsuitable for human consumption. For example, some fish may become infested with sea lice and become too unhealthy to be safely eaten.

A system may be used to increase a number of fish that become suitable for human consumption. The system may predict future health of fish, and the fish may then be selectively treated based on the predictions. For example, the system may predict that a fish will become unhealthy without sea lice mitigation and, in response, initiate sea lice mitigation for the fish. In another example, the system may predict that a fish will stay healthy without sea lice mitigation and, in response, not initiate sea lice mitigation for the fish. Additionally or alternatively, the system may reduce an impact of fish on a surrounding environment. For example, the system may keep sea lice level of fish being farmed nominal compared to background sea lice levels.

To predict the health of fish, the system may obtain observations of fish across their lifecycle, train a model to predict the health of fish based on the observations, and then use the trained model to make predictions for fish within a new population while the new population of fish is being raised. For example, the system may be trained on a first population of fish from juvenile to adult, and then be used on another different population of fish beginning from when the other population of fish are juveniles. The system may also continuously update the model. For example, the system may update an existing model based on observations of another population of fish.

Accordingly, an advantage of the system may be that the system increases a number of fish that are suitable for human consumption. Additionally or alternatively, the system may conserve resources in raising fish as only fish that need sea lice mitigation may receive sea lice mitigation. For instance, a sea lice mitigation device may be activated only for fish that are likely to benefit from sea lice mitigation, and may remain deactivated for fish that are unlikely to benefit from sea lice mitigation. Furthermore, fish sorting devices may be informed by information that specifies which fish may or may not benefit from sea lice mitigation, and may render sorting decisions accordingly.

While sea lice mitigation is described prominently throughout this specification as an example of a health condition that may be detected, tracked over time, and/or mitigated or treated, the system may similarly be used to detect, track and/or mitigate or treat for other conditions that affect the health of fish. For example, the system may be used to determine whether mitigation for one or more of pancreatic disease or spine disease should be performed for fish.

One innovative aspect of the subject matter described in this specification is embodied in a method that includes obtaining multiple observations of a population of reference fish across a period of time, generating, from the multiple observations, a record for each reference fish that indicates an extent of sea lice infestation for the reference fish across the period of time, training, based on the records, a model that determines a predicted health indicator for a fish, obtaining an image of a sample fish that is not in the population of reference fish, determining, based on the image of the sample fish and with the model, a predicted health indicator for the sample fish, and selectively initiating sea lice mitigation based on the predicted health indicator.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects determining a predicted health indicator for the sample fish includes determining an extent of sea lice infestation for the sample fish based on the image, providing, to the model, a representation of the extent of sea lice infestation for the sample fish, and obtaining, from the model in response to providing the representation, the predicted health indicator for the sample fish.

In certain aspects, determining an extent of sea lice infestation for the sample fish based on the image includes determining a location of each sea lice on the sample fish, where providing, to the model, a representation of the extent of sea lice infestation for the sample fish comprises providing an indication of the locations of each sea lice to the model. In some implementations, providing, to the model, a representation of the extent of sea lice infestation for the sample fish includes extracting visual features of the sample fish, identifying a record of previous observations of the sample fish based on the visual features, and providing, to the model, both a representation of the previous observations and the representation of the extent of sea lice infestation.

In certain aspects, selectively initiating sea lice mitigation based on the predicted health indicator includes providing, to a sea lice treatment device, an instruction to treat the sample fish for sea lice. In some aspects, selectively initiating sea lice mitigation based on the predicted health indicator includes determining that the predicted health indicator satisfies a mitigation criteria and in response to determining that the predicted health indicator satisfies the mitigation criteria, initiating the sea lice mitigation. In some implementations, selectively initiating sea lice mitigation based on the predicted health indicator includes determining that the predicted health indicator does not satisfy a mitigation criteria and in response to determining that the predicted health indicator does not satisfy the mitigation criteria, not initiating the sea lice mitigation.

In certain aspects, the record for each reference fish indicates one or more of age, weight, size, a feature vector, or various health metrics of the reference fish across the period of time, and determining the predicted health indicator for the sample fish is based on one or more of the age, the weight, the size, the feature vector, or the various health metrics of the sample fish across another period of time. In some aspects, the record for each reference fish indicates conditions of environments in which the multiple observations were made, and determining the predicted health indicator for the sample fish is based on a condition of an environment in which the image of the sample fish was obtained. In some implementations, the conditions of environments in which the multiple observations were made includes one or more of location, depth, or temperature.

In certain aspects, the record for each reference fish indicates whether sea lice mitigation was performed for the reference fish. In some aspects, generating, from the multiple observations, a record for each reference fish that indicates an extent of sea lice infestation for the reference fish across the period of time includes counting sea lice on the reference fish based on the multiple observations and storing counts of the sea lice on the reference fish in the records. In some implementations, obtaining an image of a sample fish that is not in the population of reference fish includes obtaining a set of images of the sample fish that is not in the population of reference fish, where the set of images includes the image, where determining, based on the image of the sample fish and with the model, the predicted health indicator for the sample fish is based on the set of images.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
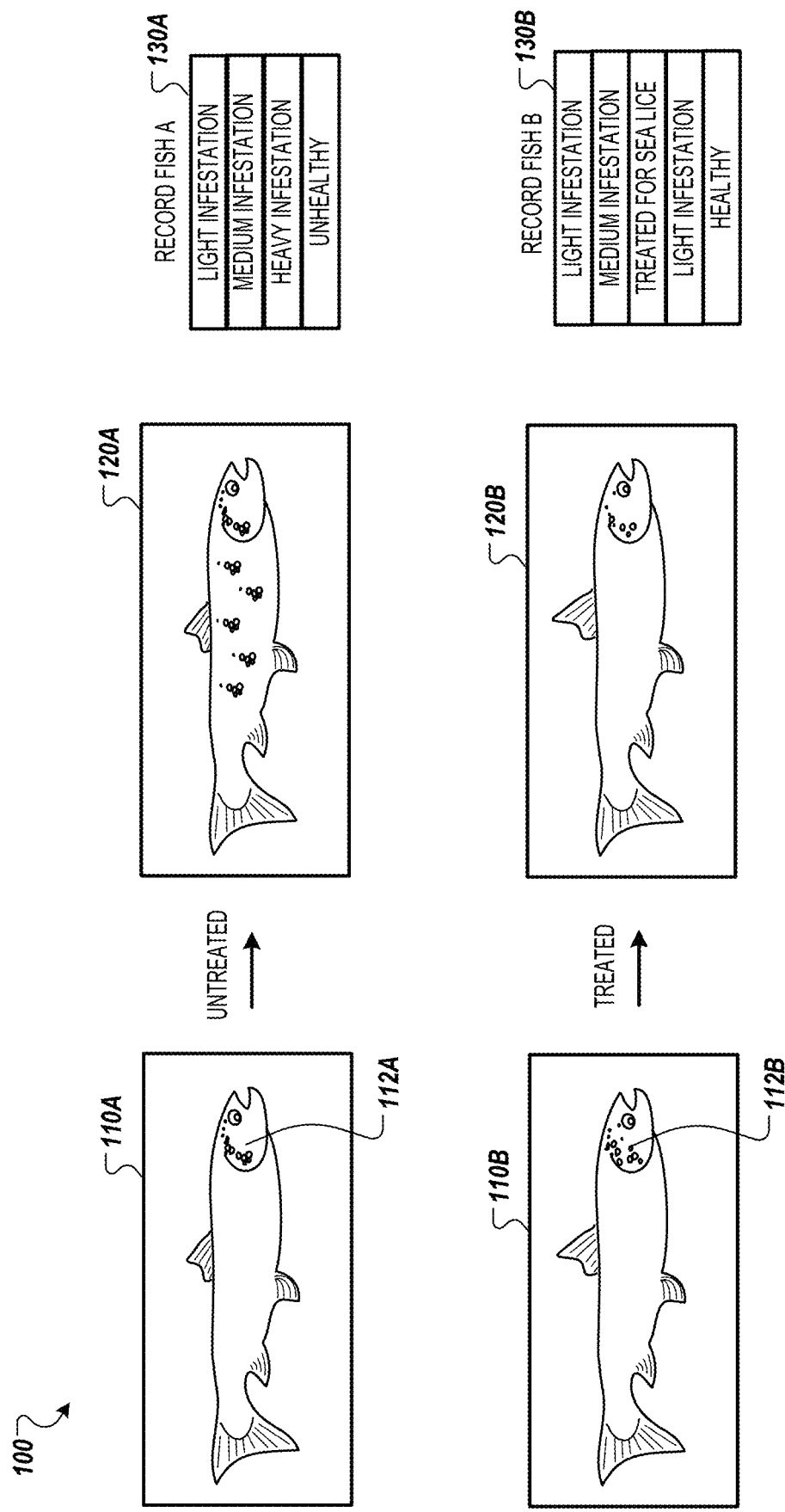
FIG. 1 is a diagram showing example images of fish and corresponding records of the fish.

FIG. 1 is a diagram 100 showing example images 110A, 110B, 120A, 120B of fish 112 and corresponding records of the fish. The image 110A shows a fish, which previously had a light infestation of sea lice, with a medium infestation of sea lice 112A. The image 120A shows that, after the fish is untreated, the fish then has a heavy infestation of sea lice and is considered unhealthy. Because the fish depicted in the image 110A and 120A was uniquely identified and tracked over time, a record 130A is able to be generated that shows that the fish (which has been labeled as Fish A) initially had a light infestation, then had a medium infestation, and then had a heavy infestation and was ultimately considered unhealthy.

The image 110B shows a second fish, that previously had a light infestation of sea lice, with a medium infestation of sea lice 112B. The image 120B shows that the second fish, after treatment, has a light infestation of sea lice and is considered healthy. Because the fist depicted in image 110B and 120B was uniquely identified and tracked over time, a record 130B is able to be generated that shows that the second fish (which has been labeled as Fish B) first had a light infestation, then had a medium infestation, then was treated for sea lice, and then had a light infestation and was considered healthy.

Figure 2:
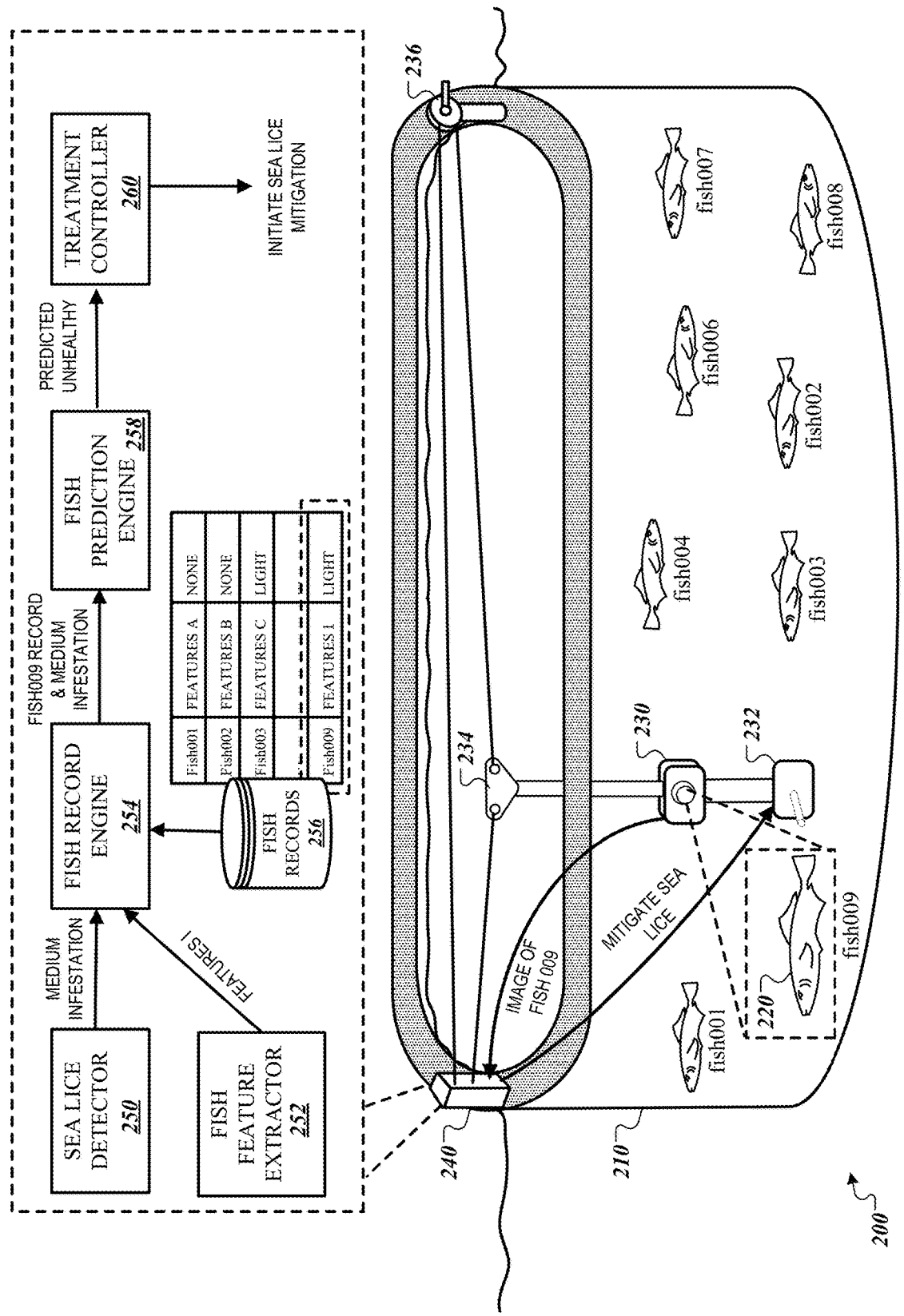
FIG. 2 is a diagram of an example system for sea lice mitigation.

FIG. 2 is a diagram of an example system 200 for sea lice mitigation. The example system 200 uses the type of information that was generated and depicted in FIG. 1 to make more intelligent decisions regarding sea lice mitigation.

In more detail, the system 200 includes a structure 210, a camera 230, a sea lice mitigation device 232, an attachment bracket 234, a far side pulley 236, and a monitoring server 240. The structure 210 may be an off-shore cage that contains live fish. The structure 210 may be configured to maintain and store aquatic cargo, such as, fish, in the open ocean and allow the aquatic cargo to move freely within the structure 210 and be monitored.

In some implementations, the structure 210 has an exoskeleton covered by a mesh netting. The mesh netting can have a hole size based on the size of the aquatic cargo contained within the structure 210. For example, if the average size of an aquatic cargo is 12 centimeters (cm) in diameter, the holes of the mesh netting can be 10 cm in diameter to prevent the cargo from exiting the structure 210. In some implementations, the mesh netting covering the exoskeleton of the structure 210 is made from material that can withstand strong ocean currents, such as iron, steel, etc. In some implementations, the structure 210 does not include mesh netting, but is environmentally sealed to protect the cargo from ocean water. In this instance, a user can view the aquatic cargo from outside the structure 210 by looking through the structure 210 or by looking down from or through the catwalk. The outside exoskeleton of the structure 210 can be a translucent material or a fully transparent material.

In some implementations, the aquatic cargo stored within the structure 210 can include finfish or other aquatic lifeforms. The cargo can include for example, juvenile fish, koi fish, salmon, sharks, trout, and bass, to name a few examples. In one example, the cargo can include individual fish and the system 100 can monitor the life maturity of the juvenile fish within the structure 210.

In some implementations, the structure 210 encompasses a wide volume to handle a large amount of aquatic cargo. For example, the volume of the structure 210 can be approximately 5,000,000 cubic feet or some other lesser volume. The structure 210 can have cylindrical shape, a spherical shape, or some other shape. The cylindrical shape can include a sealable opening at the bottom of the structure 210 to allow cargo to be inserted and released.

The camera 230 may capture images of fish in the structure 210. The camera 230 can include a stereo camera, a 3-D camera, or an action camera, or any combination of these cameras. In other implementations, the camera 230 can include one or more other sensor types in addition to the one or more media capture components. For example, the one or more other sensor types can include pressure sensors, a hydrophone, a water quality sensor, a stereo camera system, a camera system, an HD camera system, ultrasound sensors, thermal sensors, or x-ray sensors, to name a few examples.

The camera 230 may be moved using the far side pulley 236, the attachment bracket 234, and one or more pulleys within the monitoring server 240. The camera 230 may provide images of the fish to the monitoring server 240. While use of a camera 230 and images is described as being used by the system 100. The system 100 may additionally or alternatively use other sensors to capture sensory data of fish. For example, the images provided to the monitoring server 240 may be one or more of radar images where the system 100 includes a radar or hyperspectral images where the system 100 includes a hyperspectral capturing device.

The sea lice mitigation device 232 may mitigate sea lice for fish. For example, the sea lice mitigation device 232 may emit a laser beam that kills sea lice. In another example, the sea lice mitigation device 232 may include a mechanical shunt that directs a fish to swim through a chemical delousing agent. In yet another example, the sea lice mitigation device 232 may include a brush that brushes off sea lice.

The sea lice mitigation device 232 may receive instructions to mitigate sea lice from the monitoring server 240. For example, the sea lice mitigation device 232 may receive an instruction to emit a laser at a particular fish to mitigate for sea lice. In another example, the sea lice mitigation device 232 may not receive an instruction to emit a laser at a particular fish to mitigate for sea lice so the sea lice mitigation device 232 will not emit a laser at the particular fish. In yet another example, the sea lice mitigation device 232 may receive an instruction to mitigate sea lice for a particular fish and, in response, physically move the particular fish towards mitigation procedure.

The monitoring server 240 may connect to the far side pulley 236 and the attachment bracket with ropes or cable wires. The monitoring server 240 may move the camera 230 by moving its pulleys, which moves the far side pulley 236, and consequentially, moves the camera 230 to a desired location within the structure 210. For example, the monitoring server 240 may one or more of move the camera 230 to sample a whole pen, move the camera 230 to track a school of fish, and/or move the camera 230 to follow a particular fish. The desired location can be modeled by X, Y, and Z coordinates within the structure 210, which can be used to place the position of the camera capture unit for capturing media of aquatic cargo.

The system 100 can also include a monitoring server 240 that communicates with the camera 230 and the sea lice mitigation device 232. The monitoring server 240 can include one or more servers that communicate with the camera 230 and the sea lice mitigation device 232 in a wireless or wired manner. For example, the monitoring server 240 can communicate with the camera 230 and the sea lice mitigation device 232 over Bluetooth or Wi-Fi. The monitoring server 240 can include one or more processors (CPUs), one or more internal and external memory devices, and other computer components.

The monitoring server 240 may receive images of fish and selectively initiate sea lice mitigation based on the images. For example, the monitoring server 240 may receive an image of a fish 220 labeled as fish009 in FIG. 1 and initiate sea lice mitigation on the fish 220 based on the image. In another example, the monitoring server 240 may receive an image of a fish labeled as fish001 in FIG. 1 and not initiate sea lice mitigation on the fish 220 based on the image.

The monitoring server 240 includes a sea lice detector 250, a fish feature extractor 252, a fish record engine 254, a fish records database 256, a fish prediction engine 258, and a treatment controller 260. The sea lice detector 250 may obtain an image of a fish and determine an extent of sea lice infestation of the fish based on the image.

For example, the sea lice detector 250 may obtain the image 110A, detect ten sea lice on the fish, determine that fivesea lice satisfies a criteria for a medium infestation, and in response, output a classification of "medium infestation." In another example, the sea lice detector 250 may obtain an image of a fish, detect two sea lice on the fish, determine that two sea lice satisfies a criteria for a light infestation, and in response, output a classification of "light infestation." In yet another example, the sea lice detector 250 may obtain an image of a fish, detect three sea lice on the fish, and output "three" to indicate that three sea lice were detected. In still another example, the sea lice detector 250 may obtain an image of a fish, detect four sea lice on the fish, and output a map of the fish that indicates positions of each of the four sea lice on the fish. In another example, the sea lice detector 250 may output a description of classes of sea lice that are detected on the fish.

The fish feature extractor 252 may obtain an image of a fish and extract visual features of the fish based on the image. For example, the fish feature extractor 252 may identify relative positions of an eye, mouth, and gills of a fish and output visual features that indicate the relative positions of the eye, mouth, and gills. In another example, the fish feature extractor 252 may identify a pattern in a color of scales on the fish and output visual features that indicate the pattern. In yet another example, the fish feature extractor 252 may identify a feature that is computer-readable.

The fish record engine 254 may obtain the representation of the extent of sea lice infestation of a fish and the visual features of the fish, and provide a record for the fish. For example, the fish record engine 254 may obtain the indication of "medium infestation" for FISH009 from the sea lice detector 250, obtain the visual features of Features I from the fish feature extractor 252, determine that the visual features of Features I match an existing record in the fish record database 256 where the existing record indicates that FISH009 previously had a light infestation, and, in response, provide the existing record and the indication of "medium infestation" to the fish prediction engine 258.

In another example, the fish record engine 254 may obtain the indication of "heavy infestation" for FISH008 from the sea lice detector 250, obtain the visual features of Features H from the fish feature extractor 252, determine that the visual features of Features H do not match an existing record in the fish record database 256, and, in response, provide the indication of "heavy infestation" to the fish prediction engine 258.

In some implementations, the fish record engine 254 may generate records for fish when no existing record is matched for the fish and update records for fish when an existing record is matched. For example, the fish record engine 254 may determine that Features I for a fish match Features I for a record for FISH009 and, in response, determine to update the record for FISH009 to indicate an additional observation of medium infestation. In another example, the fish record engine 254 may determine that Features H for a fish do not match any features in a record and, in response, generates a new record for a fish with Features H so that later observations of the fish may be indicated in the record.

While the fish record engine 254 is shown in FIG. 1 as providing a record and a separate representation of an extent of sea lice infestation level to the fish prediction engine 258, the fish record engine 254 may update the record to include the newly determined extent of sea lice infestation level and provide the updated record to the fish prediction engine 258 without separately providing the representation of an extent of sea lice infestation.

The fish prediction engine 258 receives the record for the fish and the indication of sea lice infestation, and determines a predicted health indicator for the fish. For example, the fish prediction engine 258 receives the record for FISH009 and the indication of "medium infestation" and, in response, determines a predicted health indicator of unhealthy which may reflect that without sea lice mitigation the fish is predicted to die or be unsuitable for human consumption when harvested. In another example, the fish prediction engine 258 receives the record for FISH001 and the indication of "light infestation" and, in response, determines a predicted health indicator of healthy which may reflect that without sea lice mitigation the fish is predicted to be suitable for human consumption when harvested. In yet another example, the fish prediction engine 258 receives the record for FISH009 and the indication of ten sea lice today and, in response, determines a prediction of fifteen sea lice tomorrow.

While the fish prediction engine 258 has been described as determining a predicted health indicator for a fish, the fish prediction engine 258 may additionally or alternatively determine predictions for one or more of an entire pen or a user-defined category (e.g., small, medium, or large). For example, the fish prediction engine 258 may determine a predicted health indicator of unhealthy for the outcome of an entire pen or determine a predicted health indicator of healthy for a category of small.

The fish prediction engine 258 may make the determination based on a model that has been trained based on observations of a population of reference fish across a period of time. For example, the model may be trained based on hundreds of observations of hundreds of reference fish across the entire life cycle of the reference fish.

The model may be a machine learning model that includes one or more neural network layers. The machine learning model can include a convolutional neural network (CNN) embedding model. The CNN embedding model can include one or more LTSM layers, and may be a deep LSTM neural network architecture built by stacking multiple LSTM layers. The CNN embedding model may be trained using a loss function tuned for learning differentiation features. The different features can include triplet loss function, softmax loss function, or n-pairs loss function, to name a few examples.

The model may be used where training data includes records of fish that reflect extent of sea lice infestation across the life cycle of each fish and a health indicator for the fish that reflects whether the fish was healthy when the fish was harvested. For example, a record may indicate the extent of sea lice at twenty different observed times during a fish's life and the health indicator may indicate whether the fish was determined to be healthy when the fish was harvested. Accordingly, the model may be trained so that records for reference fish as input result in classifications into a predicted healthy indicator that matches the health indicator that was actually determined for the reference fish. The health indicator that was actually determined for the reference fish may be the outcome of the health of the fish when the fish was harvested. For example, when a particular fish is harvested a human may look at the particular fish and specify a health indicator of "healthy" for the particular fish. In another example, when a particular fish is harvested an automated system may use various sensors to obtain metrics of the particular fish using sensors and then specify a health indicator of "healthy" for the particular fish.

The treatment controller 260 receives a predicted health indicator from the fish prediction engine 258 and controls treatment of the fish based on the predicted health indicator. For example, the treatment controller 260 receives a predicted health indicator of unhealthy and, in response, initiates sea lice mitigation on the fish. In another example, the treatment controller 260 receives a predicted health indicator of healthy and, in response, does not initiate sea lice mitigation on the fish.

The treatment controller 260 may initiate sea lice mitigation by providing an instruction to the sea lice mitigation device 232. For example, the treatment controller 260 may provide an instruction of "mitigate sea lice" to the sea lice mitigation device 232.

Additionally or alternatively, the fish prediction engine 258 may use additional information besides an extent of sea lice infestation to determine a predicted health indicator for fish. The fish prediction engine 258 may use one or more of age, weight, size, motility, sex, environment (e.g., location, depth, temperature, etc.), or whether sea lice mitigation was performed for a fish in the determinations. Accordingly, the fish feature extractor 252 may determine the additional information based on the image and the fish record engine 254 may store that information and provide that information to the fish prediction engine 258. The additional information may correspondingly be used to train the model used by the fish prediction engine 258 for determining a predicted health indicator.

Different configurations of the system 200 may be used where functionality of the structure 210, the camera 230, the sea lice mitigation device 232, the attachment bracket 234, the far side pulley 236, and the monitoring server 240 may be combined, further separated, distributed, or interchanged. For example, the functionality of the treatment controller 260 may be combined into the sea lice mitigation device 232. In another example, the functionality of the monitoring server 240 may be combined into the camera 230. In yet another example, the functionality of the sea lice detector 250 may be performed by the camera 230 and the camera 230 may then provide results to the monitoring server 240.

In another example, some functionality of the fish feature extractor 252 and the fish record engine 254 may be combined. For example, the monitoring server 240 may include a machine learning model that can be trained to generate an identification of a particular fish based on the characteristics of that fish. At a later point in time, the machine learning model can re-identify the particular fish that it previously recognized. The machine learning model may re-identify the particular fish based on determining that the identification of the particular fish that was just generated from a captured image matches an identification stored in an existing record for the particular fish.

For example, some fish, such as salmon, exhibit spot patterns that are thought to be unique and identifiable over time. While original spots may grow in size and new spots may develop on salmon, the pattern and orientation of the original spots remain as the salmon ages. In this manner, the machine learning model can be trained using various techniques to identify a particular fish, such as salmon, using its unique and identifiable spots, stripes, or patterns, to name a few examples. At a later point in time, the machine learning model can receive a cropped image of a fish and generate an embedding that represents an identification of the fish. The machine learning model generates the embedding based on the identification of spots on the fish as well as other characteristics associated with the fish.

The system 200 may be implemented in a single device or distributed across multiple devices.

Figure 3:
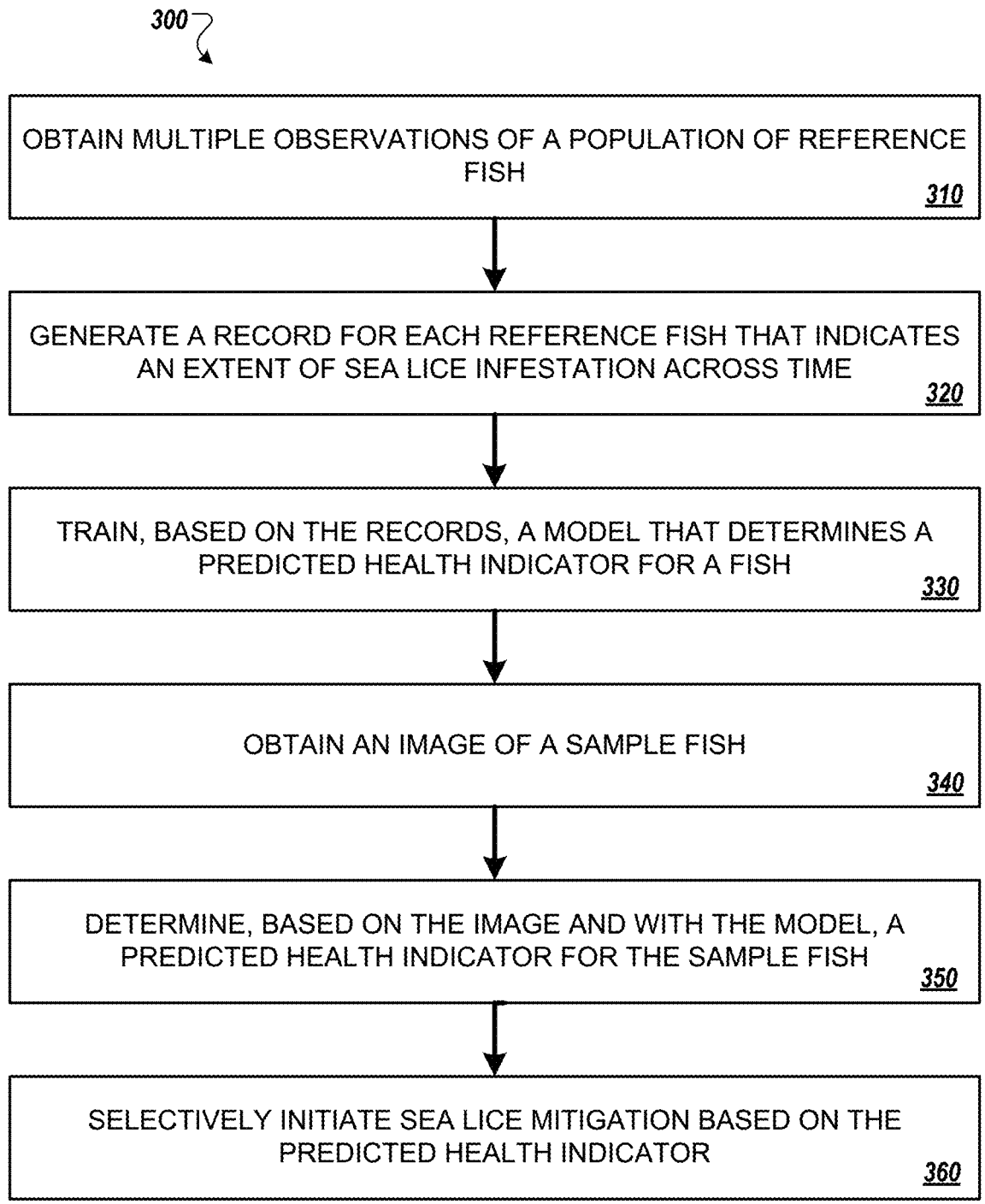
FIG. 3 is a flow diagram illustrating an example of a process for sea lice mitigation.

FIG. 3 shows a process 300 for sea lice mitigation. Briefly, and as described in more detail below, the process 300 includes obtaining multiple observations of a population of reference fish (310), generating a record for each reference fish that indicates an extent of sea lice infestation across time (320), training, based on the records, a model that determines a predicted health indicator for a fish (330), obtaining an image of a sample fish that is not in the population of reference fish (340), determining, based on the image of the sample fish and with the model, a predicted health indicator for the sample fish (350), and selectively initiating sea lice mitigation based on the predicted health indicator (360).

The process 300 includes obtaining multiple observations of a population of reference fish (310). For example, multiple images of each of the fish in the structure 210 may be captured by the camera 230 during a period of eighteen months while the fish grow from juvenile to adults.

The process 300 includes generating a record for each reference fish that indicates an extent of sea lice infestation across time (320). For example, the fish record engine 254 may generate a single record for each of the fish in the structure 210, where each record indicates visual features that uniquely identify the fish from the other fish in the structure 210 and include representations of extents of sea lice infestation for the fish across the period of eighteen months.

Generating a record for each reference fish may include receiving a representation of an extent of sea lice infestation determined from one or more images of the reference fish and visual features of the reference fish extracted from the one or more images of the reference fish, and determining that a record already exists for a fish with the visual features so adding the representation to the record. For example, the fish record engine 254 may receive a representation of an extent of sea lice infestation determined from one or more images of the reference fish and visual features of the reference fish extracted from the one or more images of the reference fish, and the fish record engine 254 may then determine that a record already exists for a fish with the visual features and, in response, update the record by adding the newly received representation.

In some implementations, the record for each reference fish indicates whether sea lice mitigation was performed for the reference fish. For example, as shown in FIG. 1, the record 130A may indicate that a fish had a light, then medium, then heavy infestation and was not treated during that entire time and when harvested was unhealthy. In another example, as shown in FIG. 1, the record 130B may indicate that a fish had a light, then medium, then light infestation and was treated after having a medium infestation and when harvested was healthy.

The process 300 includes training, based on the records, a model that determines a predicted health indicator for a fish (330). For example, the fish prediction engine 258 may receive all the fish records from the database 256 for a lifecycle of a population of reference fish, and then use the fish records as training data to train a machine-learning model to determine a predicted health indicator for a sample fish.

The process 300 includes obtaining an image of a sample fish that is not in the population of reference fish (340). For example, after the model used by the fish prediction engine 258 is trained, juvenile fish may be added to the structure 120 and the camera 230 may capture an image of a juvenile fish as a sample fish.

The process 300 includes determining, based on the image of the sample fish and with the model, a predicted health indicator for the sample fish (350). For example, the fish prediction engine 258 may receive an image of FISH009 and with the model, determine a predicted health indicator of unhealthy for FISH009.

In some implementations, determining a predicted health indicator for the sample fish includes determining an extent of sea lice infestation for the sample fish based on the image, providing, to the model, a representation of the extent of sea lice infestation for the sample fish, and obtaining, from the model in response to providing the representation, the predicted health indicator for the sample fish. For example, the sea lice detector 250 may determine a medium infestation based on an image of FISH009, provide a label of "medium infestation" to a model used by the fish prediction engine 258, and obtain from the model an output of "predicted unhealthy."

In some implementations, providing, to the model, a representation of the extent of sea lice infestation for the sample fish includes extracting visual features of the sample fish, identifying a record of previous observations of the sample fish based on the visual features, and providing, to the model, both a representation of the previous observations and the representation of the extent of sea lice infestation. For example, the fish feature extractor 252 may extract Features I from the image of FISH009, the fish record engine 254 may identify a record for FISH009 stored in the fish records database 256 based on determining that Features I from the image are identical to Features I stored in the record, and provide, to the fish prediction engine 258, both the record that was identified and the representation of "medium infestation."

The process 300 includes selectively initiating sea lice mitigation based on the predicted health indicator (360). For example, the treatment controller 260 may receive a predicted health indicator of unhealthy and, in response, initiate sea lice mitigation. In another example, the treatment controller 260 may receive a predicted health indicator of healthy and, in response, not initiate sea lice mitigation.

In some implementations, selectively initiating sea lice mitigation based on the predicted health indicator includes providing, to a sea lice treatment device, an instruction to treat the sample fish for sea lice. For example, the treatment controller 260 may provide an instruction of "Mitigate sea lice" to the sea lice mitigation device 232.

In some implementations, selectively initiating sea lice mitigation based on the predicted health indicator includes determining that the predicted health indicator satisfies a mitigation criteria and, in response to determining that the predicted health indicator satisfies the mitigation criteria, initiating the sea lice mitigation. For example, the treatment controller 260 may determine that a predicted health indicator is unhealthy and, in response, determine to initiate sea lice mitigation. In another example, the treatment controller 260 may determine that a predicted health indicator is unhealthy and a confidence from the fish prediction engine 258 is above 75%, 85%, 90%, or some other amount and, in response, determine to initiate sea lice mitigation.

In some implementations, selectively initiating sea lice mitigation based on the predicted health indicator includes determining that the predicted health indicator does not satisfy a mitigation criteria and in response to determining that the predicted health indicator does not satisfy the mitigation criteria, not initiating the sea lice mitigation. For example, the treatment controller 260 may determine that a predicted health indicator is healthy and, in response, determine not to initiate sea lice mitigation. In another example, the treatment controller 260 may determine that a predicted health indicator is unhealthy and a confidence from the fish prediction engine 258 is below 75%, 85%, 90%, or some other amount and, in response, determine not to initiate sea lice mitigation.

In some implementations, the record for each reference fish indicates one or more of age, weight, or size of the reference fish across the period of time and determining the predicted health indicator for the sample fish is based on one or more of the age, weight, or size of the sample fish across another period of time. For example, the model used by the fish prediction engine 258 may be trained on extent of sea lice infestation, age, weight, and size of reference fish, and the fish prediction engine 258 may then determine a predicted health indicator for a sample fish based on extent of sea lice infestation, age, weight, and size of the sample fish.

In some implementations, the record for each reference fish indicates conditions of environments in which the multiple observations and determining the predicted health indicator for the sample fish is based on conditions of environments in which the multiple observations. For example, the model used by the fish prediction engine 258 may be trained on position, water temperature, or depth of reference fish during observations, and the fish prediction engine 258 may then determine a predicted health indicator for a sample fish based on position, water temperature, or depth of the reference fish.

In some implementations, generating, from the multiple observations, a record for each reference fish that indicates an extent of sea lice infestation for the reference fish across the period of time includes counting sea lice on the reference fish based on the multiple observations and storing counts of the sea lice on the reference fish in the records. For example, the sea lice detector 250 may count that there are five sea lice on a fish as shown in a sample image and the fish record engine 254 may store the number five in a record for the fish.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer-implemented method comprising:
   obtaining, over a period of time, multiple observations of a first fish within a population of reference fish;
   generating, from the multiple observations, a record for the first fish indicating an extent of sea lice infestation for the first fish at each observation of the multiple observations and whether the first fish was healthy when harvested;
   training, based at least in part on the record for the first fish, a model that determines, given one or more input records for a given fish, whether the given fish is likely to be healthy when harvested;
   obtaining an image of a sample fish that is not in the population of reference fish;
   identifying a record that indicates an extent of sea lice infestation previously observed on the sample fish;
   determining, based at least on inputting the extent of sea lice infestation previously observed on the sample fish to the model, whether the sample fish is likely to be healthy when harvested; and
   selectively initiating sea lice mitigation based on determining whether the sample fish is likely to be healthy when harvested.

2. The method of claim 1, wherein determining whether the sample fish is likely to be healthy when harvested comprises:
   determining a current extent of sea lice infestation for the sample fish based on the image;
   providing, to the model, a representation of the current extent of sea lice infestation for the sample fish; and
   obtaining, from the model in response to providing the representation, a predicted future health indicator for the sample fish.

3. The method of claim 2, wherein determining the current extent of sea lice infestation for the sample fish based on the image comprises:
   determining a location of each sea lice on the sample fish,
   wherein providing, to the model, the representation of the current extent of sea lice infestation for the sample fish comprises providing an indication of locations of each sea lice to the model.

4. The method of claim 2, wherein identifying the record that indicates the extent of sea lice infestation previously observed on the sample fish comprises:
   extracting visual features of the sample fish;
   identifying the record that indicates the extent of sea lice infestation previously observed on the sample fish based on the visual features; and
   providing, to the model, both a representation of the extent of sea lice infestation previously observed on the sample fish and the representation of the current extent of sea lice infestation for the sample fish based on the image.

5. The method of claim 1, wherein selectively initiating the sea lice mitigation comprises:
   providing, to a sea lice treatment device, an instruction to treat the sample fish for sea lice.

6. The method of claim 1, wherein selectively initiating the sea lice mitigation comprises:
   determining that a predicted future health indicator satisfies a mitigation criteria; and
   in response to determining that the predicted future health indicator satisfies the mitigation criteria, initiating the sea lice mitigation.

7. The method of claim 1, wherein selectively initiating the sea lice mitigation comprises:
   determining that a predicted future health indicator does not satisfy a mitigation criteria; and in response to determining that the predicted future health indicator does not satisfy the mitigation criteria, not initiating the sea lice mitigation.

8. The method of claim 1, wherein the record for the first fish indicates one or more of age, weight, size, a feature vector, or various health metrics of the first fish at two or more different times across the period of time, and
determining whether the sample fish is likely to be healthy when harvested based on one or more of an age, weight, size, feature vector, or various health metrics of the sample fish at two or more other different times across another period of time.

9. The method of claim 1, wherein the record for the first fish indicates conditions of environments in which the multiple observations were made, and
determining whether the sample fish is likely to be healthy when harvested based on a condition of an environment in which the image of the sample fish was obtained.

10. The method of claim 9, wherein the conditions of environments in which the multiple observations were made includes one or more of location, depth, or temperature.

11. The method of claim 1, wherein the record for the first fish indicates whether sea lice mitigation was performed for the first fish.

12. The method of claim 1, wherein generating the record for the first fish comprises:
determining a number of sea lice on the first fish based on an observation of the multiple observations; and
storing, for each of the multiple observations, a corresponding determined number of sea lice on the first fish in the record.

13. The method of claim 1, wherein obtaining the image of the sample fish that is not in the population of reference fish comprises:
obtaining a set of images of the sample fish that is not in the population of reference fish, where the set of images includes the image of the sample fish,
wherein determining, based on the image of the sample fish and with the model, whether the sample fish is likely to be healthy when harvested is based on the set of images of the sample fish.

14. A system comprising:
one or more computers and one or more storage devices storing instructions that are operable, when executed by the one or more computers, to cause the one or more computers to perform operations comprising:
obtaining, over a period of time, multiple observations of a first fish within a population of reference fish;
generating, from the multiple observations, a record for the first fish indicating an extent of sea lice infestation for the first fish at each observation of the multiple observations and whether the first fish was healthy when harvested;
training, based at least in part on the record for the first fish, a model that determines, given one or more input records for a given fish, whether the given fish is likely to be healthy when harvested;
obtaining an image of a sample fish that is not in the population of reference fish;
identifying a record that indicates an extent of sea lice infestation previously observed on the sample fish;
determining, based at least on inputting the extent of sea lice infestation previously observed on the sample fish to the model, whether the sample fish is likely to be healthy when harvested; and
selectively initiating sea lice mitigation based on determining whether the sample fish is likely to be healthy when harvested.

15. The system of claim 14, wherein determining whether the sample fish is likely to be healthy when harvested comprises:
determining a current extent of sea lice infestation for the sample fish based on the image;
providing, to the model, a representation of the current extent of sea lice infestation for the sample fish; and
obtaining, from the model in response to providing the representation, a predicted future health indicator for the sample fish.

16. The system of claim 15, wherein determining the current extent of sea lice infestation for the sample fish based on the image comprises:
determining a location of each sea lice on the sample fish, wherein providing, to the model, the representation of the current extent of sea lice infestation for the sample fish comprises providing an indication of locations of each sea lice to the model.

17. The system of claim 15, wherein identifying the record that indicates the extent of sea lice infestation previously observed on the sample fish comprises:
extracting visual features of the sample fish;
identifying the record that indicates the extent of sea lice infestation previously observed on the sample fish based on the visual features; and
providing, to the model, both a representation of the extent of sea lice infestation previously observed on the sample fish and the representation of the current extent of sea lice infestation for the sample fish based on the image.

18. The system of claim 14, wherein selectively initiating the sea lice mitigation comprises:
providing, to a sea lice treatment device, an instruction to treat the sample fish for sea lice.

19. The system of claim 14, wherein selectively initiating the sea lice mitigation comprises:
determining that a predicted future health indicator satisfies a mitigation criteria; and
in response to determining that the predicted future health indicator satisfies the mitigation criteria, initiating the sea lice mitigation.

20. A computer-readable storage device encoded with a computer program, the program comprising instructions that when executed by one or more computers cause the one or more computers to perform operations comprising:
obtaining, over a period of time, multiple observations of a first fish within a population of reference fish;
generating, from the multiple observations, a record for the first fish indicating an extent of sea lice infestation for the first fish at each observation of the multiple observations and whether the first fish was healthy when harvested;
training, based at least in part on the record for the first fish, a model that determines, given one or more input records for a given fish, whether the given fish is likely to be healthy when harvested;
obtaining an image of a sample fish that is not in the population of reference fish;
identifying a record that indicates an extent of sea lice infestation previously observed on the sample fish;
determining, based at least on inputting the extent of sea lice infestation previously observed on the sample fish to the model, whether the sample fish is likely to be healthy when harvested; and selectively initiating sea lice mitigation based on determining whether the sample fish is likely to be healthy when harvested.

\* \* \* \* \*